United States Patent [19]

Greene

[11] 4,026,851

[45] May 31, 1977

[54] ACRYLATE POLYMERS CURED WITH DIAMINES IN THE PRESENCE OF AN ACID CATALYST

[75] Inventor: Robin Nikolas Greene, New Albany, Ind.

[73] Assignee: E. I. Du Pont de Nemours and Company, Wilmington, Del.

[22] Filed: Oct. 29, 1975

[21] Appl. No.: 626,756

Related U.S. Application Data

[63] Continuation-in-part of Ser. No. 605,711, Aug. 13, 1975, abandoned.

[52] U.S. Cl. .................. 260/23 AR; 260/42.52; 260/45.7 P; 260/45.7 S; 260/45.8 R; 260/45.9 R; 260/45.95 R; 260/79.5 C; 526/16; 526/30; 526/49; 526/328; 526/329

[51] Int. Cl.² ............................................ C08F 8/00

[58] Field of Search .......... 260/23 AR, 80.81, 86.7, 260/89.5 S; 450/608.5, 619.5; 526/16, 30, 49

[56] References Cited

UNITED STATES PATENTS 2,579,492   12/1951   Hansen et al. ............... 260/23 AR
3,445,413   5/1969    Jorgensen et al. ............... 260/23

Primary Examiner—Stanford M. Levin

[57] ABSTRACT

A composition consisting essentially of
a. a polymer having at least 25 weight percent of $C_1$–$C_4$ alkyl acrylate units,
b. a $C_2$–$C_{12}$ diprimary amine, and
c. at least one acid selected from
   i. $C_4$–$C_{25}$ alpha-carbon branched aliphatic acids, and
   ii. aromatic acids whose $pK_A$ in aqueous solution is at least 3.0.

14 Claims, No Drawings

ACRYLATE POLYMERS CURED WITH DIAMINES IN THE PRESENCE OF AN ACID CATALYST

This application is a continuation-in-part of my co-pending application Ser. No. 605,711, filed Aug. 13, 1975, now abandoned.

BACKGROUND OF THE INVENTION

This invention relates to the curing of an acrylate, ethylene/acrylate, or ethylene/methacrylate/acrylate polymer with diamines in the presence of certain acid catalysts.

Ethylene/acrylate or ethylene/methacrylate/acrylate polymers can be cured with free radical systems as described in U.S. Pat. No. 3,873,494, to K. J. Lewis. However, amine cures are preferred for acrylate-based polymers because they give vulcanizates with desirable properties such as low compression set, high tensile strength, and good heat aging. Also, amine vulcanization of these polymers may not require the presence of a cure site monomer in the polymer and this is desirable in terms of economy and synthesis.

U.S. Pat. No. 2,579,492, to J. E. Hansen and T. J. Dietz, describes the vulcanization of an acrylate-containing polymer with polymethylene or polyethylene diamines in the presence of a fatty acid which contains 8-18 carbon atoms. However, large amounts of the diamine are required and the rate of vulcanization is very slow. By employing the methods of the present invention, it is now possible to vulcanize acrylate, ethylene/acrylate, or ethylene/methacrylate/acrylate polymers with diamines at a much more rapid rate and with the use of smaller quantities of diamine.

SUMMARY OF THE INVENTION

This invention relates to a composition consisting essentially of about 100 parts by weight of a polymer containing at least 25 weight percent of a $C_1$–$C_4$ alkyl acrylate (e.g., ethyl acrylate is a $C_2$ alkyl acrylate), about 0.5 to 10 parts by weight of at least one $C_2$–$C_{12}$ diprimary amine, and about 0.5 to 10 parts by weight of at least one acid selected from $C_4$–$C_{25}$ α-carbon atom branched aliphatic acids and aromatic acids whose $pK_A$ in aqueous solution is at least 3.0.

DESCRIPTION OF THE PREFERRED EMBODIMENTS

This invention relates to vulcanizing certain polymers with diamines in the presence of certain acid catalysts. The polymers vulcanized according to this invention must contain at least 25 weight percent of a $C_1$–$C_4$ alkyl acrylate. If less than this amount is present, poor vulcanization occurs due to insufficient crosslink sites, and the polymer will have poor oil and heat resistance. Polymers which contain at least 25 weight percent of a $C_1$–$C_4$ alkyl acrylate are well known in the art, e.g., *Encyclopedia of Polymer Science and Technology*, Vol. 1, page 271, Interscience Publishers, New York, N.Y. (1964). Such polymers can include $C_1$–$C_4$ alkyl acrylate polymers, ethylene/$C_1$–$C_4$ alkyl acrylate dipolymers, and ethylene/$C_1$–$C_4$ alkyl methacrylate (e.g., ethyl methacrylate is a $C_2$ alkyl methacrylate)/$C_1$–$C_4$ alkyl acrylate terpolymers.

The polymer should have a molecular weight such that the melt index at 190° C. is about 0.1–70. The preferred range is about 0.5 and 15.

The poly (alkyl acrylates) described in this invention can be prepared by emulsion polymerization as described in the *Encyclopedia of Polymer Science and Technology*, Vol. 1, page 270, Interscience Publishers, New York, N.Y., 1964. Alkyl acrylate monomers used to prepare such polymers are $C_1$–$C_4$ alkyl acrylates and include: methyl acrylate, ethyl acrylate, propyl acrylates, and butyl acrylates.

The ethylene/alkyl acrylate copolymers can be prepared by a high pressure polymerization process such as that described in U.S. Pat. No. 3,350,372, to H. T. Anspon, (column 1, lines 31 etc).

Alkyl methacrylate polymers used in practicing this invention are prepared from $C_1$–$C_4$ alkyl methacrylates and include: methyl methacrylate, ethyl methacrylate, propyl methacrylates, and butyl methacrylates.

Diprimary amines useful in the compositions of this invention have the general formula $NH_2$—R—$NH_2$. These diprimary amines can contain secondary or tertiary nitrogen, ether oxygen, or sulfide sulfur without adverse results. Amines which can be used in the present invention include:

hexamethylene diamine
ethylene diamine
diethylene triamine
triethylene tetramine
xylylene diamine
1,4-butylene diamine
1,12-dodecyl diamine
amine-terminated polyethers containing up to 12 carbons atoms, such as $NH_2CH_2CH_2OCH_2CH_2NH_2$
amine-terminated polysulfides containing up to 12 carbon atoms, such as $NH_2(CH_2CH_2S)_2CH_2CH_2NH_2$ Preferred amines are hexamethylene diamine and diethylene triamine. These amines are preferred because they yield vulcanizates having the best tensile properties and they are readily available from commercial sources.

The amount of amine required is about 0.5 to 10 parts per 100 parts of polymer. If less than about 0.5 part amine per 100 parts polymer is used, the degree of cure will be too low. More than about 10 parts per 100 parts polymer does not provide any further beneficial results. Mixtures of amines can also be used.

Acid catalysts used in this invention are $C_4$–$C_{25}$ α-carbon atom branched aliphatic acids. Examples of these acids include:

2-methyl propionic acid
2-ethylbutyric acid
triethylacetic acid
pivalic acid
2-ethylhexanoic acid
2,5-dimethyladipic acid
5-norbornene-2-carboxylic acid
bicyclo[2.2.2]octane-2-carboxylic acid
cyclohexanecarboxylic acid
methylmalonic acid
2-ethylglutaric acid
α-mono- and di branched valeric, caproic, stearic, lauric, and myristic acids Aromatic acids, whose $pK_A$ in aqueous solution is at least 3.0, can also be used as acid catalysts in compositions of this invention.

Examples of these acids include:

benzoic acid
p-anisic acid
m-, or p-hydroxybenzoic acid
m-, or-p-bromobenzoic acid
m-, or p-chlorobenzoic acid
m-, or p-toluic acid The preferred acids for this invention include 2-ethylhexanoic, triethylacetic, pivalic, and benzoic.

The amount of acid required is about 0.5 to 10 parts per 100 parts of polymer. If less than about 0.5 part of acid per 100 parts polymer is used, the acid will have too low a catalytic effect. If greater than about 10 parts acid per 100 parts elastomer is used, no additional benefits are obtained.

The compositions of the present invention can contain an antioxidant of the phosphorus ester type, the hindered phenolic type, the amine type, or a mixture of two or more of these compounds.

Phosphorus ester compounds which can be used include:

tri (mixed mono- and dinonylphenyl) phosphite
tris (3,5-di-t-butyl-4-hydroxyphenyl) phosphate
high molecular weight poly (phenolic phosphonates), and
6-(3,5-di-t-butyl-4-hydroxy) benzyl-6H-dibenz[c,e]oxaphosphorin-6-oxide Hindered phenolic compounds which can be used include:

4,4-butylidenebis(6-t-butyl-m-cresol)
1,3,5-trimethyl-2,4,6-tris-(3,5-di-t-butyl-4-hydroxy benzyl)benzene
2,6-di-t-butyl-α-dimethylamino-p-cresol, and
4,4'-thiobis(3-methyl-6-t-butylphenol)

Amine antioxidants which can be used include:

polymerized 2,2,4-trimethyl-1,2-dihydroquinoline

N-phenyl-N'-(p-toluenesulfonyl)-p-phenylenediamine
N,N'-di(β-naphthyl)-p-phenylenediamine
low temperature reaction product of phenyl (β-naphthyl)amine and acetone
4,4'-bis-(α,α-dimethylbenzyl)diphenylamine The preferred antioxidant is tri (mixed mono- and dinonylphenyl) phosphite in a mixture with either 4,4'-bis-(α,α-dimethylbenzyl)diphenylamine or 4,4'-butylidenebis (6-t-butyl-m-cresol). The weight ratio of the phenolic or amine antioxidant to the phosphorus compound in the mixtures is about 0.5-3, the preferred ratio being about 1.

Compositions of this invention containing an antioxidant produce good heat-aging vulcanizates. The amount of antioxidant compound in the vulcanizing composition is about 0.1-14 5 parts per 100 parts of polymer, the preferred proportion being about 0.5-2.5. The antioxidant effect is minor below the broad range recited above. Above the broad range, little additional improvement is observed, and there may be adverse effects on the state of cure.

Fillers can be added to reduce cost and to improve the mechanical properties in a vulcanizate. A typical vulcanizable composition will usually contain about 15-40 percent by volume of fillers, depending on the reinforcing effect of the individual fillers. The preferred amount of fillers is about 20-25 percent by volume. If less than about 15 percent by volume is used, the improvement of tensile properties is quite low, while if more than about 50 percent by volume is used, the processability of the polymer may be adversely affected. Conventional fillers, including carbon black, barium sulfate, magnesium silicate, and silica, can be used.

The ingredients of the vulcanizable composition can be mixed in conventional equipment, such as a two-roll mill or a Banbury mixer. The vulcanizate may be formed and press-cured using conventional procedures at about 170°-210° C. for about 15-60 minutes.

The following examples illustrate this invention. All parts, percentages, and proportions are by weight unless otherwise specified.

In each of the following examples, copolymers were prepared by copolymerizing mixtures of ethylene and alkyl acrylate or methacrylate in the presence of a free-radical polymerization initiator in a pressure reactor at 125°-175° C. and a pressure of 1700-1900 atm. The alkyl acrylates contained 530-1200 ppm of a stabilizer, the monomethyl ether of hydroquinone. The free-radical polymerization initiator used as t-butylperoxypivalate. Each polymerization was run as a continuous process, and ethylene, acrylate monomer, and benzene solvents were fed continuously into a 325 or 720 cc. stirred autoclave at rates of 7-18 lbs./hr., 0.4-1.5 lbs./hr., and 1.1-2.5 lbs./hr., respectively. Initiator was introduced continuously at a rate of about 1.0-5.5 lbs./1000 lbs. of polymer. The reaction mixture was continuously removed from the autoclave and was stripped of unpolymerized monomers and solvent under reduced pressure and at elevated temperature.

Melt indices of the resulting polymers were determined at 190° C. as described in tentative ASTM Test Method D-1238-52T (ASTM Standards, 1955, Part 6, pages 292-295).

Copolymers were vulcanized by the following procedure. On a 2-roll ruber mill, at about 50°-75° C., were mixed copolymer, carbon black, curing agent, antioxidants, and other additives as indicated. The compositions were sheeted off the mill and specimens for physical testing were prepared. Vulcanizate slabs, 0.075 in. thick, were prepared by press-curing for 30 minutes at 180° C. at about a total gage pressure of 40,000 lbs. Modulus, tensile strength, and elongation values were obtained at room temperature by ASTM Method D-412-66 on press-cured samples. Percent volume oil swell after immersion in ASTM number 3 oil for 70 hrs. at 150° C. was determined according to ASTM D-47-1-68 on press-cured samples. Oscillating Disc Rheometer (ODR) measurements were obtained on the uncured stocks by ASTM Method D-2705. The maximum cure rate was obtained by drawing a tangent at the steepest part of the rise of the curing curve on a plot of torque versus time and dividing the night of the tangent by the time required to transverse that night.

EXAMPLE 1

This example illustrates that as the number of alkyl groups on the α-carbon of an α-carbon atom branched aliphatic acid increases, the cure rate and cure state increase.

| Masterbatch | Parts |
|---|---|
| Ethylene (47 wt.%)/methyl acrylate (53%) copolymer[a] | 100 |
| FEF carbon black | 50 |
| Tri(nonylated phenyl)phosphite[b] | 1 |
| 4,4'-Bis(α,α-dimethylbenzyl)diphenylamine | 1 |
| Aqueous 88% hexamethylene diamine | 1.5 |

| Masterbatch (parts) | 153.5 | 153.5 | 153.5 |
|---|---|---|---|
| Acid | Propionic | 2-Ethylbutyric | Triethylacetic |
| Parts | 3.0 | 3.0 | 3.7 |
| ODR at 180° C. | | | |
| Maximum rate | 0.06 | 2.3 | 2.9 |
| Tensile Properties[c] | | | |
| $M_{100}$ (psi) | 200 | 575 | 650 |
| $T_B$ (psi) | 550 | 2525 | 2650 |
| $E_B$ (%) | 960 | 340 | 285 |
| Permanent set (%) | 171 | 9 | 4.5 |
| Oil Swell[c] | 235 | 77 | 70 |

[a]Melt index 1.7
[b]Sold as "Polygard" by Naugatuck
[c]After press-curing at 180° C. for 30 min.

EXAMPLE 2

This example illustrates the vulcanization of an ethylene/methyl acrylate polymer using various α-alkyl-substituted acids and aromatic acids as accelerators.

| ODR at 200° C. Acid | Maximum Vulcanization Rate[a] | Torque after 30 min. |
|---|---|---|
| None | 1.2 | 5 |
| Pivalic acid | 6.6 | 120 |
| 2-Ethylhexanoic acid | 7.5 | 126 |
| 5-Norbornene-2-carboxylic acid | 6.2 | 99 |
| 2-Ethylbutyric acid | 10.0 | 132 |
| 2,5-Dimethyladipic acid | 5.4 | 100 |
| Benzoic acid | 5.4 | 100 |
| p-Anisic acid | 5.9 | 105 |

[a]Vulcanizable compositions contained: 100 parts ethylene (47 wt.%)/methyl acrylate (53 wt.%) polymer, 50 FEF carbon black, 1 tri(nonylated phenyl)phosphite (sold as "Polygard" by Naugatuck), 1 4,4'-bis(α,α-dimethylbenzyl)diphenylamine, 4 aqueous 88% hexamethylene diamine, 15-20 mmoles of the indicated acid.

EXAMPLE 3

This example illustrates that a salt reaction product which results when an acid and an amine are reacted can be substituted for the acid and the diamine in the vulcanizate.

| Masterbatch (parts) | Parts |
|---|---|
| Ethylene (47 wt.%)/methyl acrylate (53) copolymer[a] | 100 |
| FEF black | 50 |
| Tri(nonylated phenyl)phosphite | 1 |
| 4,4'-Bis(α,α-dimethylbenzyl) diphenyl amine | 1 |

| Samples | A | B | C |
|---|---|---|---|
| Masterbatch (parts) | 152 | 152 | 152 |
| Salt product of hexamethylene diamine/dipivalic acid reaction | 4 | — | — |
| Salt product of Hexamethylene diamine/di-2-ethylhexanoic acid reaction | — | 5 | — |
| 88% Aqueous hexamethylene diamine | — | — | 1.5 |
| 2-Ethylhexanoic acid | — | — | 6 |
| ODR at 180° C. | | | |
| Maximum rate | 2.4 | 2.5 | 2.5 |
| Tensile Properties[b] | | | |
| $M_{100}$ (psi) | 550 | 500 | 525 |
| $T_B$ (psi) | 2375 | 2425 | 2425 |
| $E_B$ (%) | 365 | 395 | 365 |
| Permanent set (%) | 10 | 11 | 10 |
| Oil Swell[b] | 84 | 80 | 78 |

[a]Melt index 1.7
[b]After curing 30 min. at 180° C.

EXAMPLE 4

This example illustrates that the branched acid catalysis is effective with various primary diamine curing agents.

| Masterbatch | Parts |
|---|---|
| Ethylene (47 wt. %)/methyl acrylate (53) copolymer[a] | 100 |
| FEF Carbon black | 50 |
| Tri(nonylated phenyl)phosphite | 1 |
| 4,4'-Bis(α,α-dimethylbenzyl)diphenylamine | 1 |

| Sample | A | B | C | D |
|---|---|---|---|---|
| Masterbatch (parts) | 152 | 152 | 152 | 152 |
| Amine | | | | |
| Aq. 88% hexamethylene diamine | 4.0 | — | — | — |
| Ethylene diamine | — | 2.0 | — | — |
| Diethylene triamine | — | — | 3.6 | — |
| Triethylene tetramine | — | — | — | 5.0 |
| 2-Ethylbutlic acid | 3.0 | 3.0 | 3.0 | 3.0 |
| ODR at 180° C. | | | | |
| Maximum rate | 3.4 | 4.2 | 1.8 | 2.0 |
| Oil Swell[b] | 55 | 47 | 36 | 34 |
| Tensile Properties[b] | | | | |
| $M_{100}$ (psi) | 675 | 750 | 1450 | 950 |
| $T_B$ (psi) | 2050 | 2000 | 2000 | 1925 |
| $E_B$ (%) | 235 | 200 | 170 | 185 |
| Permanent set (%) | 3 | 3 | 3 | 3 |

[a]Melt index 1.7
[b]After press-curing 30 min. at 180° C.

EXAMPLE 5

This example illustrates vulcanization of two other types of acrylate polymers.

| Sample | A | B |
|---|---|---|
| Polymer 1[a] | 100 | — |
| Polymer 2[b] | — | 100 |
| FEF Black | 50 | 50 |
| Tri(nonylated phenyl)phosphite | 1.0 | 1.25 |
| 4,4'-Bis(α,α-dimethylbenzyl)diphenyl amine | 1.0 | 1.25 |
| 88% Aqueous hexamethylene diamine | 4.0 | — |
| 2-Ethylhexanoic acid | 3.2 | — |
| Hexamethylene diamine/di-2-ethylhexanoic acid salt | — | 5 |
| ODR at 180° C. | | |
| Maximum rate | 3.3 | 2.7 |
| Tensile Properties[c] | | |
| $M_{100}$ (psi) | — | 325 |
| $T_B$ (psi) | 1575 | 1650 |
| $E_B$ (%) | 80 | 505 |
| Permanent set (%) | 2 | 27 |
| Oil Swell[c] | 6.5 | 121 |

[a]Poly(ethyl acrylate) prepared by solution polymerization of ethyl acrylate in benzene at 60° C. using azobisisobutyronitrile catalyst
[b]Ethylene (42 wt. %)/methyl acrylate (40)/methyl methacrylate (18) terpolymer of melt index 13.
[c]After curing 30 min. at 180° C.

EXAMPLE 6

This example shows that a branched acid is a more effective catalyst than a long chain fatty acid in vulcanizing compositions of this invention.

| Masterbatch | Parts |
| --- | --- |
| Ethylene (47 wt. %)/methyl acrylate (53) copolymer[a] | 100 |
| FEF Carbon black | 50 |
| Tri(nonylated phenyl)phosphite | 1 |
| 4,4'-Bis($\alpha$,$\alpha$-dimethylbenzyl)diphenylamine | 1 |

| Sample | A | B | C | D |
| --- | --- | --- | --- | --- |
| Masterbatch (parts) | 152 | 152 | 152 | 152 |
| Aq. 88% hexamethylenediamine | 1.5 | 1.5 | — | — |
| Triethylene tetramine | — | — | 4 | 4 |
| 2-Ethylbutyric acid (moles) | 0.034 | — | 0.024 | — |
| Stearic acid (moles) | — | 0.035 | — | 0.021 |
| ODR at 180° C. Maximum rate | 1.9 | 0.11 | 3.8 | 1.4 |
| Oil Swell[b] | 76.7 | 196.4 | 51.1 | 83.4 |
| Tensile Properties[b] | | | | |
| $M_{100}$ (psi) | 775 | 180 | 900 | 500 |
| $T_B$ (psi) | 1950 | 825 | 2025 | 2000 |
| $E_B$ (%) | 250 | 850 | 200 | 430 |
| Permanent Set (%) | 5.5 | 121 | 4 | 21 |

[a] Melt index 1.7
[b] After press-curing 30 min. at 180° C.

I claim:

1. A composition consisting essentially of:
   a. about 100 parts by weight of an acrylate, ethylene/acrylate or ethylene/methacrylate/acrylate polymer containing at least 25 weight percent of $C_1$-$C_4$ alkyl acrylate units,
   b. about 0.5-10 parts by weight of at least one $C_2$-$C_{12}$ diprimary amine, and
   c. about 0.5-10 parts by weight of at least one acid selected from
      i. $C_4$-$C_{25}$ $\alpha$-carbon atom branched aliphatic acids, and
      ii. aromatic acids whose $pK_A$ in aqueous solution is at least 3.0.

2. The composition of claim 1 in which the amine is selected from hexamethylene diamine and diethylene triamine.

3. The composition of claim 1 in which the acid is selected from 2-ethylhexanoic, triethylacetic, pivalic, and benzoic acid.

4. The composition of claim 2 in which the acid is selected from 2-ethylhexanoic, triethylacetic, pivalic, and benzoic acid.

5. The composition of claim 1 in which the polymer contains up to 75 weight percent ethylene units.

6. The composition of claim 5 in which the amine is selected from hexamethylene diamine and diethylene triamine.

7. The composition of claim 5 in which the acid is selected from 2-ethylhexanoic, triethylacetic, pivalic, and benzoic acid.

8. The composition of claim 6 in which the acid is selected from 2-ethylhexanoic, triethylacetic, pivalic, and benzoic acid.

9. The composition of claim 1 in which the polymer contains ethylene units, $C_1$-$C_4$ alkyl methacrylate units, and $C_1$-$C_4$ alkyl acrylate units.

10. The composition of claim 9 in which the amine is selected from hexamethylene diamine and diethylene triamine, and the acid is selected from 2-ethylhexanoic, triethylacetic, pivalic, and benzoic acid.

11. The composition of claim 9 in which the alkyl acrylate is selected from methyl acrylate, ethyl acrylate, propyl acrylates, and butyl acrylates, and the alkyl methacrylate is selected from methyl methacrylate, ethyl methacrylate, propyl methacrylates, and butyl methacrylates.

12. A cured composition obtained by curing at a temperature of about 170°-210° C. for about 15 to 60 minutes a composition consisting essentially of
   a. about 100 parts by weight of an acrylate, ethylene/acrylate or ethylene/methacrylate/acrylate polymer containing at least 25 weight percent of $C_1$-$C_4$ alkyl acrylate units,
   b. about 0.5-10 part by weight of at least one $C_2$-$C_{12}$ diprimary amine, and
   c. about 0.5-10 parts by weight of at least one acid selected from
      i. $C_4$-$C_{25}$ $\alpha$-carbon atom branched aliphatic acids, and
      ii. aromatic acids whose $pK_A$ in aqueous solution is at least 3.0.

13. The cured composition of claim 12 in which the polymer contains up to 75 weight percent ethylene units.

14. The cured composition of claim 12 in which the polymer contains ethylene units, $C_1$-$C_4$ alkyl methacrylate units, and $C_1$-$C_4$ alkyl acrylate units.